United States Patent
Kumar et al.

(10) Patent No.: US 9,505,971 B2
(45) Date of Patent: Nov. 29, 2016

(54) STABILIZATION OF POLYACRYLAMIDE EMULSION FORMULATIONS

(71) Applicant: Momentive Performance Materials Inc., Waterford, NY (US)

(72) Inventors: Mukesh Kumar, White Plains, NY (US); Kalman Koczo, Suffern, NY (US); John Terracina, Katy, TX (US)

(73) Assignee: Momentive Performance Materials Inc., Waterford, NY (US)

( * ) Notice: Subject to any disclaimer, the term of this patent is extended or adjusted under 35 U.S.C. 154(b) by 81 days.

(21) Appl. No.: 14/279,563

(22) Filed: May 16, 2014

(65) Prior Publication Data
US 2015/0329763 A1 Nov. 19, 2015

(51) Int. Cl.
| | | |
|---|---|---|
| *C09K 8/68* | (2006.01) | |
| *C09K 8/72* | (2006.01) | |
| *C09K 8/74* | (2006.01) | |
| *C09K 8/12* | (2006.01) | |
| *C09K 8/36* | (2006.01) | |

(52) U.S. Cl.
CPC . *C09K 8/12* (2013.01); *C09K 8/36* (2013.01); *C09K 8/68* (2013.01); *C09K 8/725* (2013.01); *C09K 8/74* (2013.01); *C09K 2208/26* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 3,542,044 A | 11/1970 | Hansen et al. | |
| 7,902,128 B2 | 3/2011 | Zhang et al. | |
| 8,030,252 B2 | 10/2011 | Shumway | |
| 8,043,999 B2 | 10/2011 | Sullivan et al. | |
| 8,211,835 B2 | 7/2012 | Howard et al. | |
| 8,466,248 B2 | 6/2013 | Meyer et al. | |
| 8,550,165 B2 | 10/2013 | Gupta et al. | |
| 2006/0106180 A1* | 5/2006 | Pantchev | C08F 220/06 526/303.1 |
| 2006/0137843 A1 | 6/2006 | Sutman et al. | |
| 2007/0202067 A1 | 8/2007 | Kolly-Hernandez et al. | |
| 2009/0163387 A1 | 6/2009 | Sullivan et al. | |
| 2009/0270280 A1 | 10/2009 | Zhang et al. | |
| 2011/0003720 A1 | 1/2011 | Sullivan | |
| 2011/0009299 A1 | 1/2011 | van Zanten | |
| 2012/0016024 A1 | 1/2012 | Ibe et al. | |
| 2012/0035085 A1 | 2/2012 | Parnell et al. | |
| 2012/0267112 A1 | 10/2012 | Zhang et al. | |
| 2012/0301414 A1 | 11/2012 | Noel et al. | |

FOREIGN PATENT DOCUMENTS

| | | |
|---|---|---|
| EP | 2 451 887 B1 | 4/2014 |
| WO | 2006/043048 A1 | 4/2006 |
| WO | 2009/133340 A1 | 11/2009 |
| WO | 2010/082158 A1 | 7/2010 |
| WO | 2011/004163 A1 | 1/2011 |

OTHER PUBLICATIONS

Hong Sun et al., "A Novel Nondamaging Friction Reducer: Development and Successful Slickwater Frac Applications", SPE 136807 (Jan. 1, 2010) XP55200887.
C.F. Aften et al., "Improved Friction Reducer for Hydraulic Fracturing", SPE 118747 (Jan. 1, 2009) pp. 19-21, XP55200884.
International Search Report and Written Opinion of the International Searching Authority mailed Jul. 17, 2015.

* cited by examiner

*Primary Examiner* — John J Figueroa
(74) *Attorney, Agent, or Firm* — Joseph S. Ostroff

(57) ABSTRACT

The current invention provides a method to form a stable blend of polyacrylamide water-in-oil emulsion and breaker surfactants such as silicon polyether copolymer and linear or branched alcohol ethoxylate surfactants. The composition can be employed, for example, as a friction reducing additive for water based fracturing fluid, or a drilling mud additive.

20 Claims, No Drawings

STABILIZATION OF POLYACRYLAMIDE EMULSION FORMULATIONS

BACKGROUND OF THE INVENTION

Field of the Invention

The present invention relates to the method of preventing premature inversion or destabilization of polyacrylamide water-in-oil emulsions while silicon polyether copolymer breaker surfactant or organic breaker surfactant or a combination of these is blended with the emulsion. Such emulsions of polyacrylamide polymers or copolymers are typically used as friction reducers in hydraulic fracturing applications.

Background of the Art

In the oil & gas industry, polyacrylamide water-in-oil emulsions are used as additives in fracturing (fracking) and drilling applications. In fracturing, a large volume of fracturing fluid is injected under high pressure into the formation in order to fracture the rock formation (shale, sandstone, limestone, etc.) and this way liberating crude oil and/or natural gas from the pores. In hydraulic fracturing applications, high molecular weight anionic and cationic polyacrylamides are used as friction reducers where the hydrated polymer suppresses the turbulence present in high velocity gradient water. Since hydraulic fracturing is performed at very high injection rates, reduction of pumping pressure as a result of friction reduction will result in less power consumption by the pumps and thus the use of effective friction reducers in fracturing fluids can decrease the cost of the operation by a large margin.

Water-in-oil emulsions of polymers of acrylamide monomers or copolymers of acrylamide and acrylate monomers are those in which the continuous phase is oil and the polymer is present in the aqueous emulsion drops (dispersed phase). Upon dilution with water-based fluids the emulsion inverts and releases the polymer into the fluid and the polymer chains hydrate. This process is known as inversion. An advantage of the water-in-oil emulsion form is that the polyacrylamide is partially hydrated in the aqueous drop phase and thus it is more easily hydrated further, without making the emulsion highly viscous.

The above water-in-oil polyacrylamide emulsions may also comprise "breaker surfactants". These can be medium (7-12) to high (12-16) HLB value (Hydrophile Lipophile Balance) surfactants. The role of the breaker surfactants is to destabilize the emulsion and promote the phase inversion upon dilution so that the polyacrylamide can easily disperse in the water phase when the water-in-oil polyacrylamide emulsions are diluted with water or brine. Therefore, these surfactants are known as "breaker surfactants" or "invertors" for water-in-oil emulsions. Silicon surfactants of medium to high HLB values (~8-16) can also destabilize the water-in-oil emulsion by phase inversion and hence can be used as breaker surfactants for water-in-oil polyacrylamide emulsions.

A potential problem with the use of breaker surfactants is that they can also enable premature inversion of the water-in-oil polyacrylamide emulsions prior to dilution during storage, handling etc. This causes a rapid increase in the viscosity of the emulsion as part of the dispersed phase is inverted into the continuous oil phase which leads to a significant increase in the emulsion's viscosity, and causes separation and handling problems. Such emulsion blends are considered as unstable and will not deliver the required performance upon dilution with water or brine. Therefore, a method is desired to prevent the inversion of the polyacrylamide water-in-oil emulsion while breaker surfactant(s) are present in the emulsion's continuous, oil phase. The present invention discloses a novel method to prevent the premature inversion of water-in-oil polyacrylamide emulsion when one or more breaker surfactant is mixed with the emulsion.

SUMMARY OF THE INVENTION

The present invention provides herein a method of stabilizing a friction reducer composition comprising
  a. polyacrylamide emulsion and;
  b. breaker surfactant
said method comprising adding an effective amount of an organic additive with the formula R—O—R', where
  R is a monovalent, linear or branched, saturated or unsaturated hydrocarbon with 1-200 carbon atoms, and R' is a monovalent, linear or branched, saturated or unsaturated hydrocarbon with 1-70 carbon atoms and can also contain oxygen, nitrogen and sulphur heteroatoms, thereby stabilizing the friction reducer composition.

In an embodiment the invention is directed to a stabilized friction reducer composition comprising
  a. a polyacrylamide emulsion,
  b. a breaker surfactant and an organic additive with the formula R—O—R',
  where
  R is a monovalent, linear or branched, saturated or unsaturated hydrocarbon with 1-200 carbon atoms, and R' is a monovalent, linear or branched, saturated or unsaturated hydrocarbon with 1-70 carbon atoms and can also contain oxygen, nitrogen and sulphur heteroatoms, and wherein the organic additive is present in an amount suitable to provide the stabilized friction reducer composition.

In another embodiment of the present invention the organic additive can be 1 wt % to 6 wt % of the total friction reducer composition.

In an embodiment of the present invention the water-in-oil emulsions used in this invention are preferably comprised of water soluble copolymers of acrylamide/acrylate monomers. Other water soluble polymers include polyethylene oxide, polyacrylamide, and partially hydrolyzed polyacrylamide. Other water soluble materials can be copolymers of acrylamide, methacrylamide, acrylic acid, methacrylic acid, alkali metal acrylate, and alkali metal methacrylates, the copolymers of acrylamide and N-vinylsulfonic acid, alkylpoly(etheroxy)acrylates, methylpropane sulfonic acid, N-(3-sulfopropyl-N-methacroyloxyethyl-N), N-dimethyl-ammonium betaine (VI), quaternary salts of dimethylaminoethyl methacrylate and dimethylaminoproyl methacrylamide, poly(dimethylaminomethylacryamide), (3-acrylamido-3-methyl)butyltrimethylammonium chloride, 2-acrylamido-2-methylpropane sulfonic acid (AMPS), dimethyldiallyl ammonium chloride. Water soluble polymers usable here also include soluble terpolymers of acrylamide, AMPS, N-vinyl-2-pyrrolidone (NVP), methylstyrene sulfate, and methacrylamidopropyltrimethylammonium chloride.

In an embodiment of the present invention the water-in-oil emulsion further comprises breaker surfactants, e.g., linear and branched alkyl/aryl alcohol ethoxylates, ethoxylates sorbitans, octylphenol ethoxylates, nonylphenol ethoxylates, ethoxylated seed oil such as castor oil and similar molecules.

In another embodiment of the present invention the water-in-oil emulsion further comprises 1-6 wt % breaker surfactant described by the following formula:

R—C$_6$H$_4$—O(C$_2$H$_4$O)$_a$Z, wherein, a=4-17,

R=linear or branched alkyl group containing from 1 to 14 carbon atoms,

Z is H, acetyl or a monovalent hydrocarbon group containing from 1 to 12 carbon atoms, Z is preferably a methyl, ethyl, propyl, isopropyl, or butyl group.

In an embodiment of the present invention the water-in-oil emulsion further comprises silicon polyether copolymer(s) as breaker surfactant(s).

In another embodiment of the present invention the water-in-oil emulsion further comprises 1-6 wt % silicon polyether copolymer breaker surfactant selected from the group consisting of a) silicone polyether(s) defined by the formula:

$$Me_3Si\text{—}O\text{—}SiMe(R)\text{—}O\text{—}SiMe_3,$$

wherein, $$R=(C_3H_6)O(C_2H_4O)_a(C_3H_6O)_b(C_4H_8O)_cZ,$$

a=4-17, b=0-26, c=0-26 and

Z is H, acetyl or a monovalent hydrocarbon group containing from 1 to 12 carbon atoms;

b) silicone polyether(s) defined by the formula:

$$Me_3Si\text{—}[OSiMe_2]_x\text{—}[O\text{—}SiMe(R)]_y\text{—}O\text{—}SiMe_3,$$

wherein, x=0-74, y=1-10, $$R=(C_3H_6)O(C_2H_4O)_a(C_3H_6O)_b(C_4H_8O)_cZ,$$

a=5-17, b=0-26.

c=0-26 and

Z is H, acetyl or a monovalent hydrocarbon group containing from 1 to 12 carbon atoms; and c) silicon polyether(s) defined by the formula:

$$Me_3Si(C_2H_4)SiMe_2(C_3H_6O)(C_2H_4O)_xZ,$$

wherein, x=3-17 and

Z=H, acetyl or a monovalent hydrocarbon group containing from 1 to 12 carbon atoms.

In an embodiment of the present invention breaker surfactant(s) is added after the water-in-oil polyacrylamide emulsion is formed and the amount can be 0.5 wt % to 7 wt % of total emulsion weight.

The composition herein is advantageously used as a friction reducer for water based fluids used for hydraulic fracturing in the oil and gas industry.

DETAILED DESCRIPTION OF THE INVENTION

In the specification and claims herein, the following terms and expression are to be understood as indicated.

As used in the specification and including the appended claims, the singular forms "a," "an," and "the" include the plural, and reference to a particular numerical value includes at least that particular value, unless the context clearly dictates otherwise.

Ranges can be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples, claims, or where otherwise indicated, all numbers expressing amounts of materials, reaction conditions, time durations, quantified properties of materials, and so forth, stated in the specification are to be understood as being modified in all instances by the term "about."

Composition percentages are given in weight percent unless otherwise indicated.

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon" means any hydrocarbon group from which one or more hydrogen atoms has been removed and is inclusive of alkyl, alkenyl, alkynyl, alkylene, cyclic alkyl, cyclic alkenyl, cyclic alkynyl, aryl, aralkyl and arenyl and may contain heteroatoms.

It will be understood herein that all measures of viscosity are obtained at 25 degrees Celsius or room temperature unless noted otherwise.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

The present invention provides herein a method to prevent premature destabilization of water-in-oil emulsion of polyacrylamide while a breaker surfactant is blended with it.

In an embodiment of the present invention the water-in-oil emulsions used in this invention preferably comprise water soluble copolymers of acrylamide/acrylate monomers. Other water soluble polymers comprise such as polyethylene oxide, polyacrylamide, and partially hydrolyzed polyacrylamide. Other water soluble materials contain copolymers of acrylamide, methacrylamide, acrylic acid, methacrylic acid, alkali metal acrylate, and alkali metal methacrylates. Other water soluble polymers include the copolymers of acrylamide and N-vinylsulfonic acid, alkylpoly(etheroxy)acrylates, methylpropane sulfonic acid, N-(3-sulfopropyl-N-methacroyloxyethyl-N), N-dimethyl-ammonium betaine (VI), quaternary salts of dimethylaminoethyl methacrylate and dimethylaminoproyl methacrylamide, poly(dimethylaminomethylacryamide), (3-acrylmido-3-methyl) butyltrimethylammonium chloride, 2-acrylamido-2-methylpropane sulfonic acid, dimethyldiallyl ammonium chloride. Also includes water soluble terpolymer of acrylamide, AMPS, NVP, methylstyrene sulfate, and methacrylmidopropyltrimethylammonium chloride.

Water-in-oil polyacrylamide emulsions for friction reduction application are those in which the continuous phase is oil and the polyacrylamide is present in the aqueous emulsion drops (dispersed phase). These are normally prepared via emulsion co-polymerization of acrylamide and the desired co-monomer in a biphasic solvent system (for example, petroleum distillate oil and water). Total actives in these emulsions can be 20-50%. Other possible components of the friction reducer composition are petroleum products in the form of oil, breaker surfactants, chelating and complexing agents, pH stabilizers, etc.

Water-in-oil polyacrylamide emulsions are frequently used as friction reducers. When the emulsion is diluted with water or brine then it inverts and the dispersed phase will deliver the polymers in the water or brine. An advantage of the water-in-oil emulsion form is that the polyacrylamide is partially hydrated in the aqueous drop phase and thus it will easily be hydrated further, without making the emulsion highly viscous. Nevertheless even this hydration process takes time with the large polymers used here.

'Friction reducers' for water based liquids are the chemical additives added to the aqueous liquids to reduce the frictional pressure during turbulent flow, for example during hydraulic fracturing of subterranean formations. These additives lower the friction or drag by suppressing the turbulence present in high velocity gradient water and as a result water can flow faster.

The dose of friction reducer is typically 0.25 gallons per 1000 gallons to 5-gallons per 1000 gallons of water.

The term 'brine' refers to a solution of water and electrolytes such as sodium chloride, potassium chloride, calcium chloride, etc.

The term 'heavy brine' is used when the concentration of the electrolytes present exceeds a certain value and has greater effect on the performance of the polymer. Heavy brines may be, for example, seawater, or recycled water/flow back (produced) water from stimulation of the wells, etc. Typically, heavy brines contain more than 3 wt % of salt in the water. Standardized 10% API brine contains 7.5% NaC and 2.5% $CaCl_2$ in water.

'Fracturing fluid' used in hydraulic fracturing or fracing is defined as the mixture of large amount of fresh or salt water (85-95%), sand, ceramic or resin coated proppant (5-15%) and <0.5% chemical additives such as friction reducers, viscosifiers, fluid loss additives, gel breakers, emulsifiers, surfactants, non-emulsifiers, pH control additives, crosslinkers, gel stabilizers, biocides, etc. The total amount of fracturing fluid used per well may be 1-4 million US gallons.

The present invention provides herein a method of stabilizing a friction reducer composition comprising
a. polyacrylamide emulsion;
b. breaker surfactant
said method comprising adding an effective amount of an organic additive with the formula R—O—R', where R is a monovalent, linear or branched, saturated or unsaturated hydrocarbon with 1-200 carbon atoms, preferably 1-100 carbon atoms, and R' is a monovalent, linear or branched, saturated or unsaturated hydrocarbon with 1-70 carbon atoms and can also contain oxygen, nitrogen and sulphur heteroatoms, preferably 1-40 carbon atoms and can also contain oxygen atoms, more preferably 1-40 carbon atoms and can also contain oxygen atoms, even more preferably R' is —C(O)R" wherein R" is a monovalent, linear or branched, saturated or unsaturated hydrocarbon with 1-40 carbon atoms.

In another embodiment of the present invention, said organic additive is a fatty acid ester.

In another embodiment of the present invention the fatty acid esters are obtained from trans-esterification of seed oils such as rapeseed, soy bean, palm, sunflower, coconut, sotton seed, hemp, canola, olive and linseed, etc. The alkyl are aryl esters may be obtained from saturated or unsaturated fatty acids such as, palmitoleic acid, oleic acid, myristoleic acid, linoleic acid, alpha-linoleic acid, stearic acid, palmitic acid, lauric acid, myristic acid, capric acid, etc.

In another embodiment of the present invention the arganic additive can be 1 wt % to 6 wt %/o of the total friction reducer composition.

In an embodiment of the present invention the water-in-oil emulsion further comprises breaker surfactant e.g., linear and branched alkyl/aryl alcohol ethoxylates, ethoxylates sorbitans, octylphenol ethoxylates, nonylphenol ethoxylates, ethoxylated seed oil such as castor oil and similar molecules.

In another embodiment of the present invention the water-in-oil emulsion further comprises a surfactant described by the following formula:

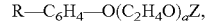
R—$C_6H_4$—O$(C_2H_4O)_a$Z, wherein, a=4-17;
R=linear or branched alkyl group containing from 1 to 14 carbon atoms;
Z is H, acetyl or a monovalent hydrocarbon group containing from 1 to 12 carbon atoms. Z is preferably methyl, ethyl, propyl, isopropyl, or butyl group.

In an embodiment of the present invention the water-in-oil emulsion further comprises silicon polyether copolymer(s) as breaker surfactant(s).

In another embodiment of the present invention the water-in-oil emulsion further comprises a silicon polyether copolymer surfactant selected from the group consisting of a) silicone polyether(s) defined by the formula:

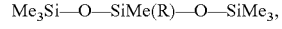
$Me_3Si$—O—$SiMe(R)$—O—$SiMe_3$, wherein,

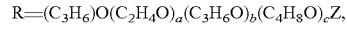
R=$(C_3H_6)O(C_2H_4O)_a(C_3H_6O)_b(C_4H_8O)_c$Z, a=4-17,
b=0-26,
c=0-26 and
Z is H, acetyl or a monovalent hydrocarbon group containing from 1 to 12 carbon atoms;

b) silicone polyether(s) defined by the formula:

$$Me_3Si-[OSiMe_2]_x-[O-SiMe(R)]_y-O-SiMe_3,$$

wherein, x=0-74,
y=1-10, $$R=(C_3H_6)O(C_2H_4O)_a(C_3H_6O)_b(C_4H_8O)_cZ,$$

a=5-17,
b=0-26,
c=0-26 and

Z is H, acetyl or a monovalent hydrocarbon group containing from 1 to 12 carbon atoms; and c) silicon polyether(s) defined by the formula:

$$Me_3Si(C_2H_4)SiMe_2(C_3H_6O)(C_2H_4O)_xZ,$$

wherein, x=3-17 and

Z=H, acetyl or a monovalent hydrocarbon group containing from 1 to 12 carbon atoms.

In an embodiment of the present invention breaker surfactant(s) is added after the water-in-oil polyacrylamide emulsion is formed and the amount can be 0.5 wt % to 7 wt % of total emulsion weight.

The composition herein is advantageously used as a friction reducer for water based fluids used for hydraulic fracturing in the oil and gas industry.

APPLICATIONS FOR THE EMBODIMENTS OF THE INVENTION

Friction Reduction

Friction reducing emulsions normally comprise a class of high molecular weight linear polymers. These can be neutral, anionic or cationic in nature. The charge on these polymers comes from the co-monomer used in the preparation. Such emulsions may also contain surfactants. The present invention describes the method to form stable emulsion blends possessing high HLB surfactants. High HLB surfactants aid in the inversion of w/o polyacrylamide emulsion, thus facilitates the release of polymer into aqueous fluid.

The availability of fresh water in some oil and gas fields is declining as the hydraulic fracturing operations are increasing to extract more and more crude oil and natural gas from rock formations. Thus, the use of produced or flowback water or recycled water remains a viable option. Recycling of produced water is an expensive process to the oil and gas industry. Produced or flow-back water as such contains large amount of salts, which may consist of a variety of mono and multivalent cations or anions and many of the anionic friction reducers fail to produce strong friction reduction in such water. Inversion of such emulsions in produced water or heavy brines requires high amounts of high HLB surfactants. Newly developed stable polyacrylamide w/o emulsion compositions comprising of high HLB surfactants and anionic polyacrylamide emulsion offers a new class of friction reducers suitable for heavy and complex brine.

EXAMPLES

Materials: Samples of polyacrylamide water-in-oil emulsions (Emulsion-1, Emulsion-2, Emulsion-3 and Emulsion-4) containing anionic polyacrylamide with petroleum distillate as a continuous phase were obtained from Kemira (Atlanta, Ga., USA), and SNF (Riceboro, Ga., USA). Samples of fatty acid ester (Additive-1) were obtained from Henkel (Cincinnati, Ohio, UA) and Cargill (Chicago, Ill., USA). Medium to high HLB value (~8-16) silicon polyether copolymer breaker surthfactants (Sil-1, Sil-2, Sil-3, Sil-4 and Sil-5) are made following known synthetic procedures. Samples of high HLB (~10-16) organic breaker surfactants (Org-1 and Org-2) were obtained from Dow Chemicals (Midland, Mich., USA).

Sample Preparation: The blends were prepared by following two approaches: (1) blending the breaker surfactant(s) (1-6 wt %) and polyacrylamide emulsion, and (2) blending Additive-1 (1-6 wt %), the breaker surfactants (1-6 wt %) and polyacrylamide emulsion. The blends were then aged in sealed vials for 24 hours and 7 days (at room temperature and 50° C.), and the viscosity of blends is measured at these time intervals. The details are described in Examples 1-4 and Tables 1-4.

The viscosity was measured with a Brookfield RV Rheometer DV-III Ultra (Brookfield, Middleboro, Mass., USA) at room temperature using a #7 spindle at 100 rpm and reported in cP (centipoise).

'Viscosity' refers to the viscosity of the polyacrylamide emulsion or blended mixture of polyacrylamide emulsion and breaker surfactant, before dilution.

The 'stability' of a blend refers to the ability of water-in-oil polyacrylamide emulsion present in the blend to resist change in its properties. In the present invention, the stability of water-in-oil polyacrylamide emulsion blends is characterized by rheology.

≥25% increase in the viscosity of a blend in 24 hours referenced to the control emulsion's 24 hours viscosity represents an 'unstable' emulsion.

<25% increase in the viscosity of a blend in 24 hours referenced to the control emulsion's 24 hours viscosity represents a 'stable' emulsion.

A blend with initial decrease (<25%) in the viscosity that is maintained upon aging is considered as 'stable' emulsion.

Example 1

Run 1: Referring to Table 1 below, 0.5 g (2 wt %) of Sil-1 was blended with 24.5 g (98 wt %) of emulsion-1. The contents were mixed for 30 minutes at room temperature.

Run 2: Referring to Table 1 below, 1.0 g (4 wt %) of the Additive-1 was blended with 23.5 g (94 wt %) of emulsion-1. The contents were mixed for 15 minutes. After that, 0.5 g (2 wt %) of Sil-1 was added while mixing. The contents were mixed for another 15 minutes.

Run 3 to Run 10: Referring to Table 1 below, the blends were prepared using Emulsion-1, Sil-2, Org-1, Org-2 and Additive-1 similarly to run 1 or run 2.

The viscosity of run 1 to run 10 and Emulsion-1 samples is shown in Table 1. The blends comprising 4 wt % of Additive-1 prior to the addition of surfactant showed much greater stability while aging at room temperature as well as at 50° C.

TABLE 1

Polyacrylamide emulsion-2 with breaker surfactants and Additive-1

| | Additive-1 (wt %) | Surfactant-#, (wt %) | Emulsion-1 (wt %) | Emulsion Viscosity (cP) with Aging | | | Emulsion Stability |
| --- | --- | --- | --- | --- | --- | --- | --- |
| | | | | 24 h, RT | 7 day, RT | 7 day, 50° C. | |
| Run 1 | 0 | Sil-1, 2 | 98 | 1400 | 1840 | 1700 | Unstable |
| Run 2 | 4 | Sil-1, 2 | 94 | 960 | 1040 | 880 | Stable |
| Run 3 | 0 | Sil-2, 2 | 98 | 1480 | 1480 | 1400 | Unstable |
| Run 4 | 4 | Sil-2, 2 | 94 | 840 | 760 | 780 | Stable |
| Run 5 | 0 | Org-1, 3 | 97 | 2040 | 1640 | 1600 | Unstable |
| Run 6 | 4 | Org-1, 3 | 93 | 920 | 840 | 960 | Stable |
| Run 7 | 0 | Org-1, 2 | 98 | 1480 | 1480 | 1400 | Unstable |
| Run 8 | 4 | Org-1, 2 | 94 | 720 | 760 | 800 | Stable |
| Run 9 | 0 | Org-2, 2 | 98 | 2800 | 2560 | 2580 | Unstable |
| Run 10 | 4 | Org-2, 2 | 94 | 1200 | 1160 | 1120 | Stable |
| Emulsion-1 (Control) | 0 | none | 100 | 1040 | 1040 | 1120 | Stable |

Example-2

Run 11 to Run 13: Referring to Table 2 below, the blends were prepared using Emulsion-2, Sil-2 and Additive-1 similarly to run 1 or run 2. The blends comprising 3 wt % or 4 wt % of Additive-1 prior to the addition of surfactant showed much greater stability while aging at room temperature as well as at 50° C.

TABLE 2

Polyacrylamide emulsion-2 with breaker surfactants and Additive-1

| | Additive-1 (wt %) | Surfactant-#, (wt %) | Emulsion-2 (wt %) | Emulsion Viscosity (cP) with Aging | | | Emulsion Stability |
| --- | --- | --- | --- | --- | --- | --- | --- |
| | | | | 24 h, RT | 7 day, RT | 7 day, 50° C. | |
| Run 11 | 0 | Sil-2, 2 | 98 | 1120 | 1380 | 1520 | Unstable |
| Run 12 | 4 | Sil-2, 2 | 94 | 560 | 560 | 720 | Stable |
| Run 13 | 3 | Sil-2, 1.5 | 94.5 | 440 | 480 | 400 | Stable |
| Emulsion-2 (Control) | 0 | None | 100 | 480 | 480 | 640 | Stable |

Example-3

Run 14 to Run 17: Referring to Table 3 below, the blends were prepared using Emulsion-3, Sil-1, Sil-2, Sil-3 and Additive-1 similarly to run 1 or run 2. The blends comprising 4 wt % of Additive-1 prior to the addition of breaker surfactant showed much greater stability while aging at room temperature as well as at 50° C.

TABLE 3

Polyacrylamide emulsion-3 with breaker surfactants and Additive-1

| | Additive-1 (wt %) | Surfactant-#, (wt %) | Emulsion-3 (wt %) | Emulsion Viscosity (cP) with Aging | | | Emulsion Stability |
| --- | --- | --- | --- | --- | --- | --- | --- |
| | | | | 24 h, RT | 7 day, RT | 7 day, 50° C. | |
| Run 14 | 0 | Sil-2, 2 | 98 | 1840 | 2020 | 2340 | Unstable |
| Run 15 | 4 | Sil-1, 2 | 94 | 640 | 640 | 640 | Stable |
| Run 16 | 4 | Sil-2, 2 | 94 | 520 | 560 | 480 | Stable |
| Run 17 | 4 | Sil-3, 2 | 94 | 640 | 600 | 640 | Stable |
| Emulsion-3 (Control) | 0 | None | 100 | 520 | 520 | 560 | Stable |

Example-4

Run 18 to Run 23: Referring to Table 4 below, the blends were prepared using Emulsion-4, Sil-2, Org-1 and Additive-1 similarly to run 1 or run 2. The blends comprising 4 wt % of Additive-1 prior to the addition of surfactant showed much greater stability while aging at room temperature as well as at 50° C.

TABLE 4

Polyacrylamide emulsion-4 with breaker surfactants and Additive-1

| | Additive-1 (wt %) | Surfactant-#, (wt %) | Surfactant-#, (wt %) | Emulsion-4 (wt %) | 24 h, RT | 7 day, RT | 7 day, 50° C. | Emulsion Stability |
|---|---|---|---|---|---|---|---|---|
| Run 18 | 0 | Sil-2, 2 | None | 98 | 2720 | 2680 | 3280 | Unstable |
| Run 19 | 0 | none | Org-1, 2 | 98 | 2360 | 2240 | 3820 | Unstable |
| Run 20 | 0 | Sil-2, 1 | Org-1, 1 | 98 | 2360 | 2280 | 2560 | Unstable |
| Run 21 | 4 | Sil-2, 1 | Org-1, 1 | 94 | 680 | 640 | 600 | Stable |
| Run 22 | 4 | Sil-2, 1 | Org-1, 1.5 | 93.5 | 840 | 960 | 880 | Stable |
| Run 23 | 4 | Sil-2, 1.25 | Org-1, 1.25 | 93.5 | 880 | 1040 | 920 | Stable |
| Emulsion-4 (Control) | 0 | none | None | 100 | 800 | 800 | 680 | Stable |

Example 5

Referring to Table 5 below, anionic polyacrylamide emulsions (Emulsion 1-3) were blended with silicon polyether copolymer and Additive-1 (Formulations 1-8) and all the formulations were aged for 24 hours before measurement.

A Rheometer, model Physica MCR 301 (Anton Par, Ashland, Va., USA) was used to investigate the rheological properties of the new compositions using the coaxial cylinder measuring system (Bob Radius 13.331 mm, Cup Radius 14.460 mm, Measuring Gap 1.129 mm). All the experiments were carried out at 25° C. and at 2500 $s^{-1}$ shear rate.

1.66 wt % of Formulations 1, as described in Table 2, were injected to a measured amount of 10% brine containing 7.5% NaCl and 2.5% $CaCl_2$ and the viscosity of the solutions was monitored for 300 s. 'Hydration viscosity' in the table refers to the viscosity value obtained after hydration of the polyacrylamide polymer in brine during rheology experiment. All other experiments were conducted in identical experimental conditions.

"% Increase in Hydration Viscosity" of polyacrylamide is calculated by referencing the hydration viscosity of Emulsion 1-3 obtained at 300 s. 'Viscosity' refers to the viscosity of the polyacrylamide emulsion or blended mixture of polyacrylamide emulsion and silicon polyether. This was measured with a Brookfield RV Viscometer DV-III Ultra (Brookfield, Middleboro, Mass., USA) at room temperature using #7 spindle at 100 rpm.

'Tolerance of brine' refers to the capacity of polyacrylamide polymer to get hydrated in the brine. This was qualitatively determined based on the physical appearance of the resultant fluid from rheology experiment. "Good" rating means no precipitation or flocculation, "Fair" rating means that only moderate precipitation or flocculation, while "Bad" rating means that strong precipitation or flocculation was observed.

'Hydration viscosity' refers to the viscosity value obtained after hydration of the polyacrylamide polymer in brine during rheology experiment. The viscosity data is reported in centipoise (cP) unit or otherwise noted.

TABLE 5

Composition, viscosity, rheology and brine tolerance of the formulations containing anionic polyacrylamide emulsion, breaker surfactant and Additive-1

| | Composition and Viscosity | | | | Rheology | | |
|---|---|---|---|---|---|---|---|
| | Emulsion# (wt %) | Additive-1, (wt %) | Surfactant#, (wt %) | Viscosity (cP) | Hydration Viscosity at 300 s (cP) | % Increase in Hydration Viscosity | Tolerance of Brine |
| Emulsion-1 | 100 | 0 | 0 | 1040 | 6 | None | Bad |
| Formulation 1 | Emulsion-1, 94 | 3 | Sil-4, 3 | 640 | 7 | 16 | Fair |
| Formulation 2 | Emulsion-1, 92 | 3 | Sil-4, 5 | 760 | 12 | 100 | Good |
| Emulsion-2 | 100 | 0 | 0 | 560 | 6 | None | Bad |
| Formulation 3 | Emulsion-2, 94 | 3 | Sil-4, 3 | 400 | 13 | 116 | Good |
| Formulation 4 | Emulsion-2, 92 | 3 | Sil-4, 5 | 560 | 22 | 266 | Best |
| Formulation 5 | Emulsion-2, 96 | 3 | Sil-2, 1 | 560 | 18 | 200 | Good |
| Emulsion-3 | 100 | 0 | 0 | 640 | 6 | None | Bad |
| Formulation 6 | Emulsion-3, 94 | 3 | Sil-4, 3 | 640 | 14 | 133 | Good |
| Formulation 7 | Emulsion-3, 92 | 3 | Sil-4, 5 | 760 | 16 | 166 | Good |
| Formulation 8 | Emulsion-3, 94 | 3 | Sil-5, 3 | 400 | 27 | 350 | best |

The breaker surfactants used herein facilitated inversion of dispersed phase of water-in-oil polyacrylamide emulsion when they were blended with such emulsions. This caused a rapid increase in the viscosity of the emulsion as part of the dispersed phase was inverted into the continuous oil phase which leads to a significant increase in the emulsion's viscosity. Such blends were considered as unstable. On the other hand, addition of Additive-1 prior to the addition of above said breaker surfactants resulted in stable blends. The accelerated aging test at 50° C. revealed that Additive-1 stabilized samples have high kinetic stability and longer shelf life. As shown in Example 5 and Table 5, the presence of organic additive does not have a negative impact on the inversion of the polyacrylamide emulsion which is suggested by the high inversion and high hydration viscosities of the formulations 1-8 as compared to corresponding controls (Emulsion-1 or Emulsion-2 or Emulsion-3).

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of stabilizing a friction reducer composition comprising
   (a) polyacrylamide emulsion; and,
   (b) breaker surfactant selected from the group consisting of
   (1) silicone polyether(s) defined by the formula:

wherein

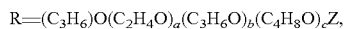

wherein
   a=4-17,
   b=0-26,
   c=0-26, and
   Z is H, acetyl or a monovalent hydrocarbon group containing from 1 to 12 carbon atoms;
   (2) silicone polyether(s) defined by the formula:

Me$_3$Si—[OSiMe$_2$]$_x$—[O—SiMe(R)]$_y$—O—SiMe$_3$, wherein
   x=0-74,
   y=1-10,

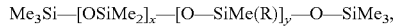

a=5-17,
   b=0-26,
   c=0-26, and
   Z is H, acetyl or a monovalent hydrocarbon group containing from 1 to 12 carbon atoms; and,
   (3) silicon polyether(s) defined by the formula:

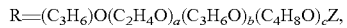

wherein
   x=3-17, and Z is H, acetyl or a monovalent hydrocarbon group containing from 1 to 12 carbon atoms
   said method comprising adding an effective amount of an organic additive with the formula R—O—R', where
   R is a monovalent, linear or branched, saturated or unsaturated hydrocarbon with 1-200 carbon atoms, and
   R' is a monovalent, linear or branched, saturated or unsaturated hydrocarbon with 1-70 carbon atoms and optionally containing at least one of oxygen, nitrogen and sulphur heteroatoms, to the friction reducer composition, thereby stabilizing said friction reducer composition.

2. The method of claim 1 wherein said emulsion is water-in-oil emulsion.

3. The method of claim 1 wherein said polyacrylamide is an anionic polyacrylamide.

4. The method of claim 1 wherein
   R is a monovalent, linear or branched, saturated or unsaturated hydrocarbon with 1-100 carbon atoms, and
   R' is a monovalent, linear or branched, saturated or unsaturated hydrocarbon with 1-40 carbon atoms and optionally contains oxygen atoms.

5. The method of claim 4 wherein
   R' is a monovalent, linear or branched, saturated or unsaturated hydrocarbon with 1-40 carbon atoms and optionally contains oxygen atoms.

6. The method of claim 5 wherein
   R' is —C(O)R" wherein R" is a monovalent, linear or branched, saturated or unsaturated hydrocarbon with 1-40 carbon atoms.

7. The method of claim 1 wherein said organic additive is a fatty acid ester.

8. The method of claim 1 wherein said organic additive is 1 wt % to 6 wt % of the formulation.

9. The method of claim 1 wherein the said breaker surfactant is 1 wt % to 6 wt % of the friction reducer composition.

10. The method of claim 1 wherein said stabilized friction reducer composition is added to water and/or brine at a dosage rate of from 0.25 to 5 gallons to 1,000 gallons of water or brine.

11. A hydraulic fracturing operation utilizing the stabilized friction reducer composition produced by the method of claim 1.

12. A drilling operation utilizing the stabilized friction reducer composition produced by the method of claim 1.

13. A coil tubing operation utilizing the stabilized friction reducer composition produced by the method of claim 1.

14. An acidizing operation utilizing the stabilized friction reducer composition produced by the method of claim 1.

15. A stabilized friction reducer composition comprising
   a. a polyacrylamide emulsion;
   b. a breaker surfactant selected from the group consisting of
   (1) silicone polether(s) defined by the formula:

wherein

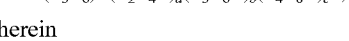

wherein
   a=4-17,
   b=0-26,
   c=0-26, and
   Z is H, acetyl or a monovalent hydrocarbon group containing from 1 to 12 carbon atoms:
   (2) silicone polyether(s) defined by the formula:

wherein
   x=0-74,
   y=1-10,

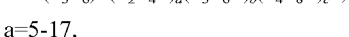

a=5-17,
   b=0-26, c=0-26, and

Z is H, acetyl or a monovalent hydrocarbon group containing from 1 to 12 carbon atoms; and, and (3) silicon polyether(s) defined by the formula:

Me$_3$Si(C$_2$H$_4$)SiMe$_2$(C$_3$H$_6$O)(C$_2$H$_4$O)$_x$Z, wherein x=3-17, and Z is H, acetyl or a monovalent hydrocarbon group containing from 1 to 12 carbon atoms; and, c. an organic additive with the formula R—O—R', where R is a monovalent, linear or branched, saturated or unsaturated hydrocarbon with 1-200 carbon atoms, and R' is a monovalent, linear or branched, saturated or unsaturated hydrocarbon with 1-70 carbon atoms and optionally containing at least one of oxygen, nitrogen and sulphur heteroatoms, and wherein the organic additive is present in an amount suitable to provide a stabilized friction reducer composition.

16. The stabilized friction reducer composition of claim 15 wherein

R is a monovalent, linear or branched, saturated or unsaturated hydrocarbon with 1-100 carbon atoms, and R' is a monovalent, linear or branched, saturated or unsaturated hydrocarbon with 1-40 carbon atoms and optionally containing at least one oxygen atom.

17. The stabilized friction reducer composition of claim 16 wherein R' is a monovalent, linear or branched, saturated or unsaturated hydrocarbon with 1-40 carbon atoms and optionally contains at least one oxygen atom.

18. The stabilized friction reducer composition of claim 17 wherein R' is —C(O)R" wherein R" is a monovalent, linear or branched, saturated or unsaturated hydrocarbon with 1-40 carbon atoms.

19. The stabilized friction reducer composition of claim 15 wherein said organic additive is a fatty acid ester.

20. The stabilized friction reducer composition of claim 15 wherein said organic additive is 1 wt % to 6 wt % of the formulation.

* * * * *